Patented Oct. 5, 1943

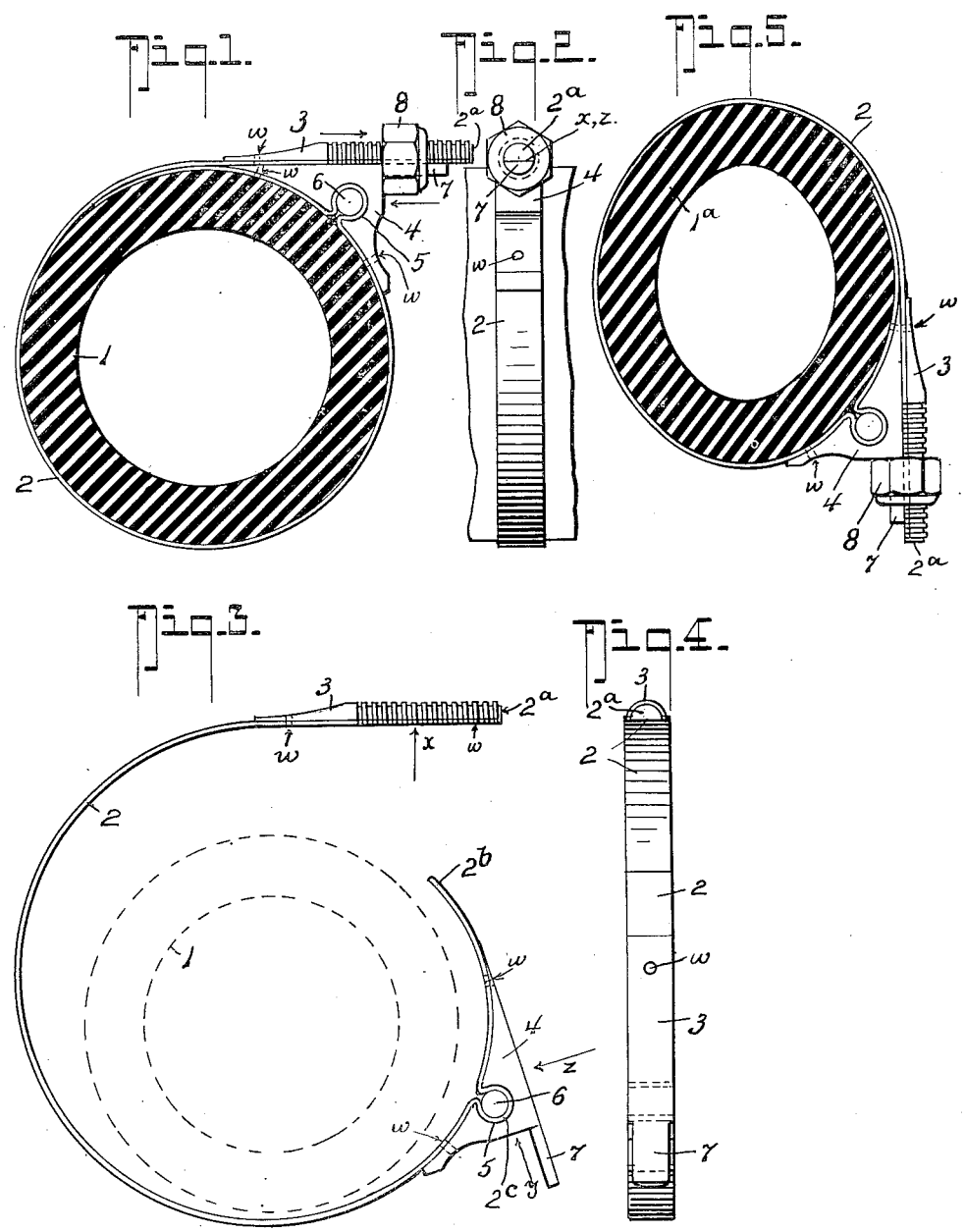

2,330,898

UNITED STATES PATENT OFFICE 2,330,898

HOSE CLAMP

James T. King, Burbank, Calif.

Application June 1, 1943, Serial No. 489,291
In Great Britain February 23, 1943

8 Claims. (Cl. 24—19)

My invention relates to the art of hose clamps and it particularly has for its object to provide a clamp which complies in all respects to the requirements of existing Army and Navy standards for hose clamps.

More specifically, the invention has for its objects: to provide a clamp which is especially adapted for use with all forms of bullet-proof hose connections; a clamp throughout a full circle (360°) with the entire area of the clamping band used as a tensioning medium; a clamp of light weight and relatively great strength; a clamp which is corrosion proof and fire proof; a clamp which can be quickly installed and disconnected, one so constructed that it may be opened up for installation on any connected fuel or oil line, and one that can be easily put in places where it is awkward to place and tension clamps without the use of special tool, and one that can be installed by the average mechanic, using one hand. Further objects of the invention are to provide a hose clamp embodying the following characteristics:

A one-piece construction that can be made by means of a coin press operation formed from metal strip section or swedged from round or half round metal; no reverse torque stresses are required to release tension for the hose clamp's removal; by virtue of its one-piece construction, combined with great strength, it is especially suited for high pressure hydraulic hose connections for which no existing hose clamp is satisfactory; it is adapted for use on all forms and sizes of hose connections, including hose of other shapes than circular, as for example, stream line shapes or elliptical shapes.

Other objects will in part be obvious and in part pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a side elevation of a clamp embodying my invention, the hose being shown in section.

Fig. 2 is a view of the parts shown in Fig. 1 looking from right to left in Fig. 1.

Fig. 3 is a side elevation of the clamp with the nut omitted.

Fig. 4 is an elevation of the part shown in Fig. 3 looking from right to left in Fig. 3.

Fig. 5 is a view similar to Fig. 1 showing the clamp fitted to an elliptical hose.

In the drawing in which like numerals of reference indicate like parts in all the figures, 1 represents a hose, 2 a flexible band one end of which is permanently secured to a threaded rod-like member 3 in any suitable way as, for example, by spot welds $w$.

The fixed radius block 4 has its longer flat face, indicated by the arrow $z$, arranged tangentially to the curvature of the band 2 to which it is secured by means of a loop $2^b$ fitted into a circular cross hole 5 in the block 4 and spot welded to the block by welds $w$. The welds are provided only to retain the block in place on the band and are not relied upon to retain the strap or band 2 on the block. The retaining is accomplished by the loop and by a pin 6 driven tightly into the loop $2^b$.

The face of the block which is at right angles to the face indicated by arrow $z$ is indicated by the arrow $y$ and constitutes the abutment face of the block. From the face indicated by arrow $y$ projects the half round non-threaded rod 7 whose flat face is in the plane of the face of the block 4 that is indicated by the arrow $z$. The radius of curvature of the rod 7 is approximately that of the internal diameter of the nut 8 or, in other words, it is of the same diameter as the inside thread diameter of the rod-like member 3.

The two flat surfaces indicated by the arrows $x$ and $z$ in Fig. 3 lie in contact when the clamp is in use as clearly shown in Fig. 1.

If desired the end of the strap or band 2 may be bent at right angles over the end of the member 3 as at $2^a$ to serve to relieve, in part, the strains on the welds of the member 3.

Attention is called to the fact that the threads of the member 3 are extended over the sides of the band 2 which underlie the member 3 as clearly shown in Figs. 1, 3 and 5. Thus the nut 8 has threaded engagement not only with the member 3 but also with the band or strap 2 which relieves some of the strain on the welds which secure the band and members together.

In the modification (in shape of hose) shown in Fig. 5 those parts which are the same in construction to the parts in the preceding figures bear the same reference character, the modified form of hose however bears the same reference character as in Fig. 1 plus the index letter $a$.

When the clamp is applied to a hose the nut 8 bears against the abutment face of the block 4 and applies a pushing force to the block while at the same time applying, through the threads of the member 3 and the band 2, a pulling force that is tangential to the circumference of the hose 1. The free end 2ᵇ of the band 2 prevents the hose being pinched or cut by the thin edge of the block and ensures that the force applied to the hose in radial directions extends throughout a full 365°. The loop or roll 5 receives the direct pull or tension and not the free end of the band. In the construction illustrated the action of the nut on the threaded member and on the abutment results in a compression force being applied in one direction and a tension force in the opposite direction which tends to reduce the diameter of the circle without distorting the circle.

If desired the band and threaded member may be made integral by a stamping-die operation as will be clear to those skilled in the art.

If desired the weld w between the block 4 and the band 2 may be omitted as the loop or roll 5 and wedge pin 6 will securely hold the block to the band.

From the foregoing description taken in conncetion with the accompanying drawing, it is thought that the construction, operation and advantages of the invention will be clear to those skilled in the art to which it relates.

What I claim is:

1. A hose clamp comprising a flexible band one end of which is provided with a threaded rod-like member, said band near its other end being provided with an outwardly projecting loop, a radius block having a face to conform to the curvature of the band and being provided with a cross loop-receiving hole, said block having a flat face lying tangentially to the curve of the band and being provided with a non-threaded rod-like extension paralleling the tangential face of the block and constructed to lie in contact with and parallel to said threaded rod-like member when the clamp is in use, said block having an abutment face adjacent said rod-like extension, and a nut on said rod-like member and over said rod-like extension and lying against said abutment face when the clamp is in use for purposes described.

2. The hose clamp of claim 1, wherein a wedge pin is tightly held in the loop within the cross hole.

3. The hose clamp of claim 1, wherein a pin is located in said loop for purposes described.

4. A hose clamp comprising a flexible band, a threaded rod-like member under which one end of the band lies and to which that end is permanently secured, the underlying portion of said band having threads in continuation of the threads of said threaded rod-like member, a radius block having a curved face and a cross hole opening into said curved face with a restricted passage, said band having a portion lying against said curved face and having a loop lying in said cross hole, said block having a flat face and a rod-like extension with a flat face, said flat faces lying in a plane tangential to said curved face, said block having an abutment face normal to said tangential face, and a nut threaded on said threaded member and over said rod-like extension to engage said abutment face, for purposes described.

5. The hose clamp of claim 4, wherein a retaining pin is located in said loop.

6. In a hose clamp wherein is provided a flexible band having a threaded rod-like member at one end, a radius block having a face shaped to conform to the curvature of the band and having a flat face lying tangentially to the curve of the band and being provided with a rod-like member paralleling the tangential face of the block for cooperation with the rod-like member of the band, and a nut cooperating with both rod-like members: the improvement which comprises the provision of a transverse loop-receiving hole in the block with a slot entering the hole from the conforming face of the block, and the provision of a loop in the band intermediate its ends which loop lies in said hole and slot.

7. The hose clamp of claim 6 wherein a pin is wedged in the loop to prevent the band pulling out at the slot.

8. The hose clamp of claim 6 wherein there are welds attaching the band to the conforming face of the block at either side of the slot.

JAMES T. KING.